United States Patent [19]

Downing

[11] Patent Number: 4,680,981
[45] Date of Patent: Jul. 21, 1987

[54] RACK AND PINION GEAR AND A METHOD OF ASSEMBLING SUCH A GEAR

[75] Inventor: Philip A. Downing, Bristol, United Kingdom

[73] Assignee: TRW Cam Gears Limited, Hertfordshire, Great Britain

[21] Appl. No.: 704,420

[22] Filed: Feb. 22, 1985

[30] Foreign Application Priority Data

Feb. 27, 1984 [GB] United Kingdom ............... 8405076

[51] Int. Cl.⁴ .............................................. B62D 3/12
[52] U.S. Cl. ....................................... 74/422; 29/434; 74/498
[58] Field of Search ..................... 74/422, 498, 89.17; 180/148, 147; 29/434

[56] References Cited

U.S. PATENT DOCUMENTS

| | | | |
|---|---|---|---|
| 3,037,485 | 6/1962 | Adams | 180/148 |
| 3,142,197 | 7/1964 | Le Tourneau | 74/422 |
| 4,016,724 | 4/1977 | Baker et al. | 74/422 |
| 4,189,955 | 2/1980 | Bishop | 74/498 |
| 4,271,716 | 6/1981 | Carduner | 74/422 |
| 4,444,070 | 4/1984 | Yanai | 74/498 |
| 4,475,413 | 10/1984 | Higuchi | 74/498 |
| 4,539,857 | 9/1985 | Kako et al. | 74/498 |

FOREIGN PATENT DOCUMENTS

| | | | |
|---|---|---|---|
| 2458320 | 6/1976 | Fed. Rep. of Germany . | |
| 0076757 | 6/1981 | Japan | 74/422 |
| 243377 | 7/1926 | United Kingdom | 74/498 |
| 776052 | 6/1957 | United Kingdom | 74/422 |
| 1525760 | 9/1978 | United Kingdom . | |
| 1604243 | 12/1981 | United Kingdom . | |
| 2096729 | 10/1982 | United Kingdom . | |

Primary Examiner—Allan D. Herrmann
Attorney, Agent, or Firm—Tarolli, Sundheim & Covell

[57] ABSTRACT

A rack and pinion gear and a method of assembling such a gear. The gear has a rack bar 1 the rack 4 of which is biased into engagement with the pinion 6 by a spring loaded support 7 which slidably (or rolling) engages a bearing surface 8 of the rack bar. The bearing surface has a central region 9 parallel to the rack axis and tapering end regions 10 and 11 which reduce the thickness of the rack bar from the central region 9. The length C of the region 9 corresponds to 1 to 1.5 revolutions of the pinion 6 while the operative length A of the rack corresponds to at least three revolutions of the pinion. The pinion rotates about an eccentric axis 14 which varies the rack bar tightness. To determine the position of maximum tightness in which the spring loading of the support 7 is to be adjusted, the pinion is rotated from a central position on the rack 4 clockwise and counterclockwise to displace the rack bar in each instance through a distance corresponding to 0.5 revolutions of the pinion from the said central position. During this displacement the reaction on the support 7 is observed to determine the position in which the maximum tightness of the rack bar is encountered where the spring loading of the support means is finally set.

The invention is applicable to supports 7 which engage the rack bar in one or more positions around the support surface.

5 Claims, 1 Drawing Figure

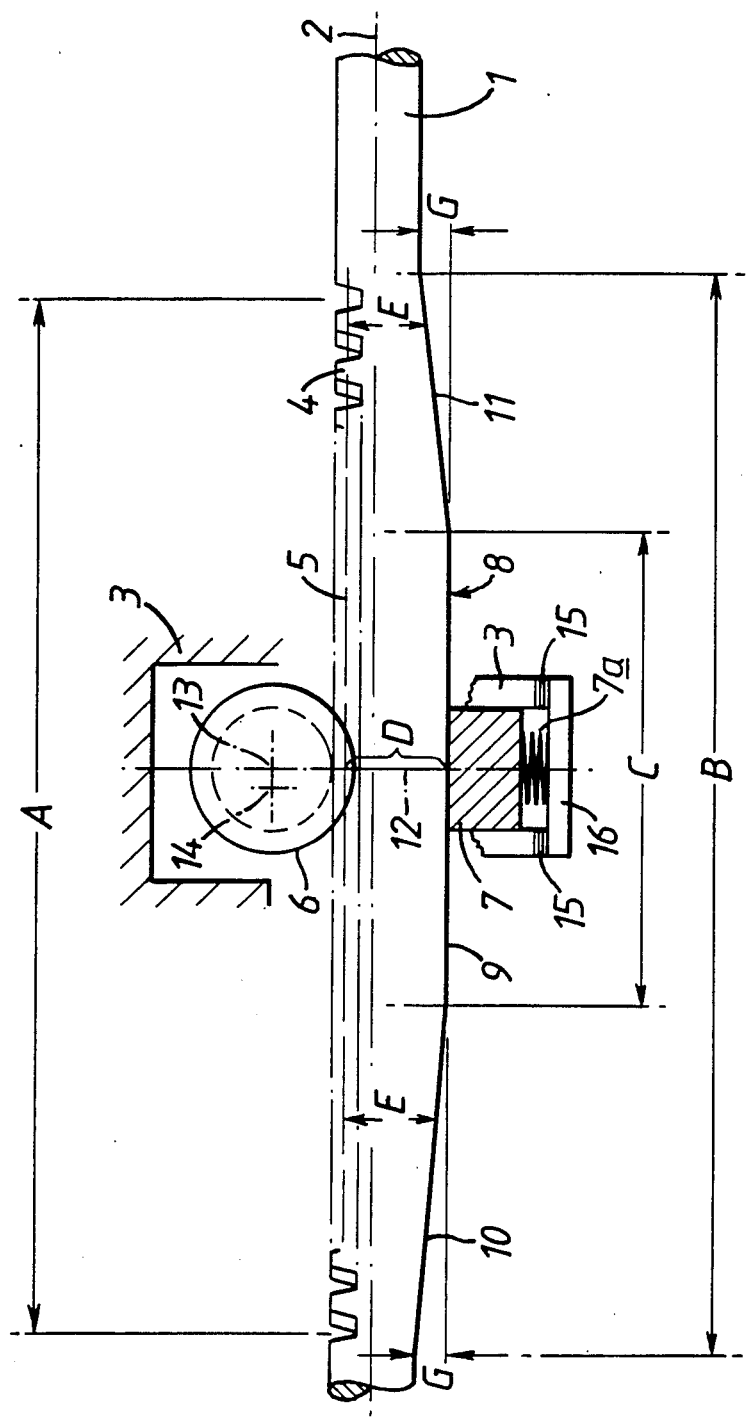

RACK AND PINION GEAR AND A METHOD OF ASSEMBLING SUCH A GEAR

TECHNICAL FIELD AND BACKGROUND ART

This invention relates to a rack and pinion gear and to a method of assembling such a gear and is primarily concerned with rack and pinion gears as are employed in motor vehicle steering systems.

Conventionally a rack and pinion gear for vehicle steering has a rack bar mounted in a pinion housing to be displaceable along its longitudinal axis. Rotatably mounted in the housing is a pinion the teeth of which engage with the teeth of a rack on the rack bar so that rotation of the pinion effects in the required displacement of the rack bar. In the majority of applications, and for ease of manufacture, the rack teeth are substantially co-planar and parallel to the longitudinal axis of the rack bar whereby it is intended that as the pinion rolls over the rack bar the spacing between the pinion axis and the longitudinal axis of the rack bar is maintained constant. It is also conventional to provide in the pinion housing support means such as a yoke or slipper which is located oppositely to the position of engagement between the rack and pinion to slidably engage the rack bar on the side thereof remote from the rack and to resiliently bias the rack into engagement with the pinion as the rack bar is displaced over the operative length of its rack which, for vehicle steering, usually corresponds to three to six revolutions of the pinion.

It is important, particularly for vehicle steering purposes, that the rack bar is borne by the support means to exhibit smooth displacement within the pinion housing while sufficient force is exerted by the support means to maintain the rack and pinion in engagement (bearing in mind the forces which will be exerted between the engaging teeth and which tend to move those teeth apart during normal use of the gear. For economy of manufacture on a large scale as is usual for rack and pinion steering gears, the tolerances to which the individual components of a rack and pinion assembly can be manufactured are such that with a gear of the kind discussed above, the spacing between the pinion axis and the longitudinal axis of the rack bar is not maintained constant as the rack bar is driven over the operative length of the rack. Accordingly, when the rack bar is not subjected to a steering load the support means is likely to be displaced against, and under the influence of, its resilient biasing as the rack bar is driven within the pinion housing so that the "tightness" of the rack bar (that is the resistance which it experiences to its longitudinal displacement in the housing) can vary in accordance with the changes in the biasing force applied by the support means. The above-mentioned displacement of the support means may be attributed, partly to pemissible tolerances in the manufacture of the pinion, which tolerances may permit the pinion to rotate about an eccentric axis so that as the pinion rotates the spacing between its axis and the longitudinal axis of the rack bar changes and partly to permissible tolerances in the rack bar itself and in the rack teeth formed in the rack bar. Because of the difference in characteristics caused by permitted tolerances in manufacture, which will vary from one rack and pinion gear to another, it is standard practice that each gear when assembled has its support means adjusted to apply the maximum biasing force to urge the rack and pinion into engagement when the rack bar is at its tightest position in the housing, that is with the rack bar located in the housing so that the pinion axis and the rack axis are at their maximum spacing. The aforementioned maximum biasing force is of course predetermined according to the particular gear characteristics. Conventional practice therefore in the rack and pinion steering gear industry is that a gear, having been assembled, is finally adjusted by rotating the pinion to move over the operative length of the rack; determining the position of maximum tightness of the rack bar in the housing, and at that position adjusting the pressure biasing applied by the support means to the maximum force at which it is intended the rack should be urged into engagement with the pinion when the rack bar is unloaded. By such a procedure it will be apparent that as the unloaded rack bar is driven within the pinion housing the biasing force from the support means should never be greater than that originally intended and the possibility of the rack bar becoming "too tight" in the housing is alleviated. It will be realised that when the rack bar is loaded during its use for steering purposes, the biasing force exerted from the support means may be considerably greater than that to which it is adjusted when the bar is unloaded and this is taken into consideration, as is well known in the art, during the adjustment and depending upon the characteristics of the support means.

From the aforegoing it will be seen that in conventionally constructed rack and pinion gear assembly of the kind above referred to, the final adjustment of the gear to determine the appropriate resilient biasing provided by the support means can be a time consuming process which adds considerably to the manufacturing costs and is usually regarded as an inconvenience. It is an object of the present invention to provide a rack and pinion gear and a method of assembling such a gear by which the aforegoing disadvantages can be alleviated.

STATEMENTS OF INVENTION AND ADVANTAGES

According to the present invention there is provided a rack and pinion gear assembly comprising a rack bar having a longitudinal axis along which it is displaceable in a pinion housing; a rack on the rack bar the teeth of which are substantially co-planar and parallel to the longitudinal axis; a pinion rotatably mounted in the housing with its teeth engaging the rack so that rotation of the pinion effects in said displacement of the rack bar; said rack having an operative length corresponding to at least three revolutions of the pinion; support means mounted in the housing oppositely to the position of engagement between the rack and pinion to engage a smooth bearing surface of the rack bar on the side thereof remote from the rack and to resiliently bias the rack into engagement with the pinion; said bearing surface being substantially co-extensive longitudinally with the operative length of the rack and comprising a central bearing region which is substantially parallel to the longitudinal axis and end bearing region which extend smoothly and longitudinally from the central region one to each end of the bearing surface; said central bearing region extending longitudinally for a distance which at least corresponds to the displacement of the rack bar caused by one revolution of the pinion and which is not greater than the displacement of the rack bar caused by 1.5 revolutions of the pinion and being disposed to extend longitudinally substantially symmetrically about a notional line which is perpendicular to the longitudinal axis and which passes through the mid-length position of the operative length of the rack and wherein the thickness of the rack bar perpendicularly from the plane of its rack to the central bearing region is greater than the corresponding thickness to each end bearing region.

Further according to the present invention there is provided a method of assembling the rack and pinion gear as specified in the immediately preceding paragraph which comprises mounting the pinion, rack bar and support means in their operative positions in the housing; locating the rack bar for the pinion to engage the rack at a test position substantially corresponding to the mid-length position of the operative length of the rack; rotating the pinion to displace the rack axially in one direction and then in the opposite direction from the test position in each instance through a distance from the test position which corresponds to at least half a revolution of the pinion and which is not greater than three quarters of a revolution of the pinion; during said displacement of the rack from the test position determining an adjustment position of engagement of the pinion with the rack which corresponds to the maximum displacement of the support means against its resilient biasing and, with the rack and pinion in said adjustment position, adjusting the support means to provide a predetermined biasing force which is applied thereby to the bearing surface of the rack bar.

In applying the present invention the rack bar is formed, during its manufacture, with a central bearing region which, in effect, stands proud of the end bearing regions which extend from that central region to form the bearing surface. As a consequence the bearing surface may have a "humped" configuration even though this may not be discernible to the eye. To give an example of the extent of the aforementioned "humping" in the bearing surface of the rack bar, modern manufacturing techniques for the components in the gear are such that the main cause of the displacement of the support means towards and from the pinion axis during longitudinal displacement of the unloaded rack bar is the pinion rotating about an eccentric axis. The manufacturing tolerances of the pinion may permit an eccentricity of, say, 0.004 inches (0.10 millimeters). To accommodate for such eccentricity in the pinion, the differential in thickness of the rack bar (taken perpendicularly to the plane of the rack) between the central bearing region and each end bearing region, is preferably at least the error in the concentricity of the pinion.

The "hump" effect provided by the central and end bearing regions gives a considerable advantage in the ease with which the final adjustment of the resilient biasing of the support means can be determined to ensure that the rack bar does not run too tight. To achieve this it is merely necessary to locate the rack bar so that its rack engages with the pinion at the test position (in the mid-length position of the operative length of the rack) in which the support means will engage the bearing surface substantially at the mid-length position of the central bearing region; with the rack bar so positioned the pinion is rotated half a revolution in one direction and thereafter one revolution in the opposite direction (so that the rack bar will be displaced by a distance corresponding to half a revolution of the pinion on each side of the test position). During this latter displacement of the rack bar the adjustment position is determined where the pinion engages with the rack and the maximum displacement of the support means away from the plane of the rack teeth is observed. The rack and pinion are now located in the adjustment position and finally the support means is adjusted to apply the required biasing force to the bearing surface. Following adjustment of the support means in the adjustment position, this position should correspond to the rack and pinion being in their tightest engagement (since the eccentricity of the pinion will have been allowed for during its revolution in driving the rack bar from the test position and since the end bearing regions are disposed nearer to the plane of the rack than is the central bearing region). Consequently the present invention avoids the requirement of displacing the whole operative length of the rack over the pinion to determine the "tightest" condition of the support means on the bearing surface (which tightest condition may indeed be found towards or at one end of the bearing surface beneath an end of the rack) and then adjusting the biasing force of the support means in that position.

The manner in which the biasing force of the support means may be adjusted in the adjustment position is well known in the art, for example, by use of shims or adjustment screws in the pinion housing.

The length of the central bearing region corresponds at least to one revolution of the pinion to ensure that the eccentricity of the pinion will be encountered in determining the adjustment position. The length of the central bearing region can be greater than the said one pinion revolution to provide adequate length within which to determine the adjustment position, however a central bearing region greater than 1.5 revolutions of the pinion is considered excessive and unnecessary.

It is important that the bearing surface presented by the central and end bearing regions of the rack bar permit a smooth movement over the support means. Usually the support means will slidably engage the bearing surface although the invention is applicable to support arrangements comprising a roller that rotates as the support surface moves over it.

Preferably the end bearing regions taper uniformly and linearly over their longitudinal extents from the central bearing region to the respective ends of the bearing surface so that the effective thickness of the rack bar (taken perpendicularly from the plane of its rack) progressively decreases in a direction from the central bearing region to the remote ends of the respective end bearing regions.

The present invention is applicable to rack bars of any cross sectional shape but especially to the conventional part circular section, T-section or triangular section. Furthermore, it is to be realised that the present invention is applicable to support means which engage with the bearing surface at two or more support positions which are spaced around the periphery of the rack bar on the side thereof remote from the rack and at each of these support positions the same considerations will apply for determining the differential in thickness of the rack bar between the respective central and end bearing regions.

The profile presented by the central and end bearing regions of the bearing surface can be determined during machining of the rack bar or otherwise, for example by use of appropriately shaped dies in forging or coining the bearing surface (possibly simultaneously with forging or coining of the rack).

DRAWING

One embodiment of a rack and pinion gear constructed in accordance with the present invention will now be described, by way of example only, with reference to the accompanying illustrative drawing which shows a side elevation of the gear and, for convenience of explanation, is diagrammatic in so far as it is not drawn to scale and indeed many features of the gear are shown exaggerated.

DESCRIPTION OF DRAWING

The rack and pinion gear assembly illustrated is intended for use in a vehicle steering system as is well known in the art and comprises a rack bar 1 having a longitudinal axis 2. The rack bar is mounted in a pinion housing 3 to be displaceable relative thereto along its axis 2 and has a rack 4 the teeth of which lie in a plane 5 which is parallel to the longitudinal axis 2. A pinion 6 is rotatably mounted in the housing 3 with its teeth engaging the rack 4 so that rotation of the pinion effects in the longitudinal displacement of the rack bar 1 to provide a steering output in conventional manner. The rack 4 has an operative length A with which the pinion is intended to engage and which operative length usually corresponds to approximately 5 revolutions of the pinion for moving the steering system from one full lock condition to the other.

The rack bar 1 is supported in the housing 3 by a pad, yoke, slipper or similar member 7 which slidably engages a smooth bearing surface 8 of the rack bar on the side thereof remote from the pinion 6. The support 7 is located in the housing 3 directly opposite to the position of engagement between the rack and pinion teeth and is resiliently biased, conveniently by a spring 7a, relative to the housing 3 to urge the rack and pinion into engagement. The biasing of the rack teeth into engagement with the pinion is provided by the support 7 throughout the operative length A of the rack and accordingly the bearing surface 8 has an effective length B which is substantially co-extensive with the rack length A and presents a smooth surface to provide low friction running over the support 7.

The bearing surface 8 has a central bearing region 9 and end bearing regions 10 and 11 which extend longitudinally from the central region 9, one to each of the respective ends of the bearing surface 8. The central bearing region 9 extends parallel to the rack bar axis 2 for a distance C which corresponds to the displacement of the rack bar caused by one revolution of the pinion 6; in addition the central bearing region 9 extends longitudinally substantially symmetrically about a notional line 12 which is perpendicular to the longitudinal axis 2 and passes through the mid-length position of the operative length A of the rack 4.

As will be seen from the drawing, each of the end bearing regions 10 and 11 tapers uniformly and smoothly from the central region 9 to the respectively adjacent end of the bearing surface 8 so that the thickness of the rack bar taken perpendicularly from the plane 5 of the rack is progressively reduced by the end bearing regions 10, 11 as those regions approach the ends of the bearing surface. More particularly in the drawing the aforementioned thickness of the rack bar over the length of the central bearing region 9 is of substantially constant thickness D while the corresponding thickness over the length of the rack bar on which the end bearing regions 10 and 11 are formed reduces as indicated at E. It will be realised that the bearing surface 8 does not necessarily consist of the central and end bearing regions 9 to 11 as shown and, if required, the ends of the bearing surface remote from the central bearing region 9 can extend from the respective ends of the tapered end regions 10 and 11 to be substantially parallel with the rack bar axis 2 provided that the bearing surface is smooth and that the end bearing regions 10 and 11 give a differential in thickness of the rack bar as indicated at G. For convenience of explanation the thickness differential G presented by the "humped" configuration of the bearing surface has been shown greatly exaggerated and in practice the differential G may be indiscernible to the eye, say in the order of 0.004 inches (0.10 millimeters).

Due to manufacturing tolerances in the components of the gear assembly the resistance to longitudinal displacement of the rack bar (or the "tightness" of the rack bar) will vary as the rack bar is driven by the pinion through the housing. One reason for this variation in tightness is the manufacturing tolerance permitted for the pinion which, theoretically, should rotate about a central axis 13 but ,because of the manufacturing tolerances, in practice may rotate about an eccentric axis 14 (which is shown with greatly exaggerated displacement). As a consequence of this eccentric rotation, the force on the rack bar between the pinion and the support 7 will change as the pinion is rotated to displace the support 7 towards and from the pinion axis 14 and thereby change the tightness of the rack bar. Following assembly of the gear it is important that the final adjustment of the resilient biasing presented by the support 7 is made when the rack and pinion are positioned for maximum tightness of the rack bar so that although the resistance to longitudinal displacement of the rack bar will change (particularly when a steering load is applied to the rack bar and there is a corresponding increase in the loading on the support 7 to maintain the rack and pinion in engagement) the position of maximum tightness of the rack bar in the housing 3 will be maintained constant. Once the position of maximum tightness of the rack bar has been determined, the biasing provided by the spring 7a through the support 7 can be set in accordance with the characteristics required of the gear.

To effect the final adjustment of the assembly, the rack bar 1 is located in the housing for the pinion 6 to engage with the rack 4 at a test position which corresponds to the mid-length position of the operative length A of the rack (so that the support 7 engages the central bearing region 9 in the mid part of its length C as shown). The pinion 6 is now rotated about its eccentric axis 14 clockwise in the drawing and through half a revolution to drive the rack bar leftwardly and so that the righthand end of the central region 9 moves onto the support 7; following this the pinion rotation is reversed and the pinion is rotated counter-clockwise through one revolution to drive the rack bar rightwardly so that the lefthand end of the central region 9 is moved onto the support 7. During this displacement of the rack bar 1 from its test position it will be apparent that because the pinion has exhibited one revolution, the effect of its eccentricity will have been fully applied to displace the rack bar axis 2 away from the pinion axis 14. Accordingly an adjustment position is determined where the pinion engages with the rack and the maximum displacement of the suport means against its resilient biasing is encountered. The rack and pinion are now located in their adjustment position and in this position the loading applied by the spring 7a is adjusted to that required for biasing the support 7 in accordance with predetermined characteristics of the gear. Adjustment of the biasing provided by the spring 7a can be achieved in conventional manner, for example by use of shims 15 which are located between side walls of the housing 3 and an end plate 16 of the housing against which the spring reacts. The aforementioned adjustment position will always correspond to the position in which maximum tightness (resistance to longitudinal displacement of the rack bar) is encountered in view of the humped configuration presented by the bearing surface 8 and the fact that the eccentricity of the pinion has been fully accounted for in determining the adjustment position over the length C of the central bearing region. As a consequence, irrespective of whether the rack bar is unloaded or has a steering load applied thereto, the adjustment position will correspond to the position of maximum tightness for the rack bar in accordance with the reaction from the spring 7a.

The position of the eccentric axis 14 is unknown when the rack and pinion are in their test position and to ensure that the position of maximum tightness of the rack bar is encountered during the displacement of the central bearing region 9 over the support 7 it may be advisable to rotate the pinion through slightly in excess of the one revolution in determining the adjustment position; accordingly the length C of the central region 9 should correspond to the displacement of the rack bar by the rotation which is intended for the pinion in determining the adjustment position. For this reason the length C of the central bearing region 9 may correspond to a displacement of the rack bar caused by 1.5 revolutions of the pinion but a length greater than this is considered excessive and unnecessary.

The teeth in the rack 4 may be of a form which provides either a constant or a varying gear ratio which is transmitted from the pinion to the rack bar and both of which forms are well known in the art. With varying ratio gear teeth it is well known to manufacture the teeth by coining or forging between opposed dies and conveniently the profile of the bearing surface 8 is pressed onto the rack bar during the coining or forging process.

Although the drawing shows a simple form of sliding support 7 which, as aforementioned, may be in the form of a yoke or slipper, it is to be realised that the present invention is applicable to other forms of support and rack bars as are well known in the art. By way of example, the support may comprise a roller and/or engage with the support surface 8 at two or more positions spaced around the periphery of that surface (similarly to the support arrangement disclosed in G.B. Patent Specifications Nos. 1,604,243, 2,096,729 and 1,525,760) and the bearing surface will be appropriately profiled in a similar manner to that described above for each of the respective regions of contact between the support means and the bearing surface.

It will be realised that the aforementioned procedure for assessing the tightest position of the rack bar will take into account the permissible tolerances in manufacture of the rack bar, the pinion and indeed of all of the components in the gear assembly.

I claim:

1. A rack and pinion gear assembly comprising:
   a housing;
   a rack bar having rack gear teeth and a longitudinally extending axis and being longitudinally displaceable in said housing;
   a pinion having gear teeth and rotatably mounted in said housing and having its gear teeth in engagement with the gear teeth of said rack bar so that rotation of said pinion effects longitudinal displacement of said rack bar;
   support means located between said rack bar and said housing on the side of said rack bar remote from said pinion, said rack bar having a bearing surface on said remote side of said rack bar, said support means engaging said bearing surface and resiliently biasing said rack bar to urge the gear teeth thereof into engagement with the gear teeth of said pinion, and said support means including means for adjusting the biasing force applied to said rack bar;
   said gear teeth of said rack bar forming a longitudinally extending array of coplanar teeth thereon, the operative length of said array of coplanar teeth corresponding to at least three revolutions of said pinion, said bearing surface being substantially co-extensive longitudinally with said operative length and comprising a central bearing region which is substantially parallel to the longitudinally extending axis of said rack bar and two end bearing regions extending longitudinally from opposite ends of said central bearing region;
   said central bearing region extending longitudinally for a distance which corresponds at least to the displacement of said rack bar caused by one revolution of said pinion and which is not greater than the displacement of said rack bar caused by one and a half revolutions of said pinion, said central bearing region extending longitudinally substantially symmetrically relative to a line perpendicular to the longitudinal axis of said rack bar and which passes through the mid-length position of said operative length; and
   the distance between said longitudinally extending axis of said rack bar and said bearing surface in a direction transverse to said longitudinally extending axis being greater in the central bearing region than in the end bearing regions.

2. An assembly as claimed in claim 1 in which the end bearing regions taper uniformly over their longitudinal extents from the central bearing region so that the effective distance between the bearing surface and the longitudinally extending axis of the rack bar progressively decreases in a direction from the central bearing region to the remote ends of the respective end bearing regions.

3. An assembly as claimed in claim 1 in which the end bearing regions are substantially linear over their longitudinal extents.

4. An assembly as claimed in claim 1 wherein the differential in the distance between the longitudinally extending axis of the rack bar and the bearing surface in the central bearing region and each end bearing region is equal or greater than any eccentricity of the axis of rotation of the pinion.

5. A method of assembling a rack and pinion gear which includes a housing, a rack bar longitudinally displaceable in said housing in response to rotation of a pinion rotatably mounted in said housing, and support means located between said rack bar and said housing on the side of said rack bar remote from said pinion and engaging a bearing surface on said remote side of said rack bar for resiliently biasing gear teeth of the rack bar into engagement with the gear teeth of the pinion, the bearing surface comprising a central bearing region which is substantially parallel to the longitudinally extending axis of said rack bar and two end bearing regions extending longitudinally from opposite ends of the central bearing region, the central bearing region extending longitudinally for a distance which corresponds at least to the displacement of the rack bar caused by one revolution of the pinion and which is not greater than the displacement of the rack bar caused by one and a half revolutions of said pinion, the distance between the longitudinally extending axis of the rack bar and the bearing surface being greater in the central bearing region of said bearing surface than in the end bearing regions thereof, said method comprising the steps of:

mounting the pinion, the rack bar, and the support means in the gear housing;
   moving the rack bar relative to the pinion to a position in which the pinion engages the rack bar at the mid-length thereof and the support means engages the central bearing region in the middle thereof;
   rotating the pinion to displace the rack bar axially in opposite directions from the mid-length position through a distance equal to at least a half-length of the central bearing region; and
   adjusting the support means to apply a predetermined biasing force to the central bearing region at the position in which the distance between the axes of the pinion and the rack bar is the greatest.

* * * * *